United States Patent [19]

Takatori et al.

[11] Patent Number: 5,185,816
[45] Date of Patent: Feb. 9, 1993

[54] METHOD OF SELECTING CHARACETERISTICS DATA FOR A DATA PROCESSING SYSTEM

[75] Inventors: Sunao Takatori; Ryohei Kumagai; Koji Matsumoto; Makoto Yamamoto, all of Tokyo, Japan

[73] Assignee: Yozan, Inc., Tokyo, Japan

[21] Appl. No.: 627,208

[22] Filed: Dec. 13, 1990

[30] Foreign Application Priority Data

Dec. 25, 1989 [JP] Japan ............... 1-335960

[51] Int. Cl.$^5$ ............... G06K 9/62; G06K 9/40
[52] U.S. Cl. ............... 382/34; 382/15; 382/56; 395/23
[58] Field of Search ............... 382/14, 15, 56, 34; 395/20, 21, 22, 23

[56] References Cited

U.S. PATENT DOCUMENTS

| | | | |
|---|---|---|---|
| 4,760,604 | 7/1988 | Cooper et al. | 395/21 |
| 4,805,225 | 2/1989 | Clark | 395/21 |
| 4,945,494 | 7/1990 | Penz et al. | 395/22 |
| 4,965,725 | 10/1990 | Rutenberg | 382/15 |

OTHER PUBLICATIONS

Esther Levin, A Recurrent Neural Network: Limitations and Training, Feb. 1990 pp. 641–650.
Fernardo Pineda, Generalization of Back propagation to Recurrent and Higher Order Neural Networks, Nov. 1988 pp. 602–610.

Primary Examiner—Joseph Mancuso
Assistant Examiner—Christopher Kelley
Attorney, Agent, or Firm—Cushman, Darby & Cushman

[57] ABSTRACT

A method of selecting characteristics data for a data processing system from a group of input data for reducing data volume of each input data by said data processing system having a neural network structure or a structure equivalent thereto, where each input data consists of a plurality of said characteristics data. The method includes the steps of storing outputs of said input data; selecting a specific characteristics data of a pair of different input data; exchanging said characteristics data of said input data pair with each other; comparing outputs from said data processing system in response to said input data before and after the exchange of said characteristics data; and removing said characteristics data from said input data in said group, when a difference between said outputs before and after is comparatively small.

1 Claim, 2 Drawing Sheets

METHOD OF SELECTING CHARACTERISTICS DATA FOR A DATA PROCESSING SYSTEM

FIELD OF THE INVENTION

The present invention relates to a method of selecting characteristics data in a data processing system from a group of input data for reducing data volume of each input data, wherein said data processing system has a neural network structure or a structure equivalent thereto and an input data consists of a plurality of said characteristics data.

BACKGROUND OF THE INVENTION

The neural network, as is generally and conventionally known, is comprised of neurons in parallel layers. According to each neuron, output data 0 are output corresponding to the comparison results between the sum of multiplied input data I1, I2, I3 ... In by weights W1, W2, W3 ... Wn and threshold $\theta$. Various comparison methods are possible. For example, as to normalization function 1 [f], output data 0 can be expressed as:

$$O = 1 \, [\Sigma W_n \cdot I_n - \theta]$$

Here, when $\Sigma W_n \cdot I_n$ exceeds a threshold $\theta$, output data becomes "1", and when $\Sigma W_n \cdot I_n$ is less than threshold $\theta$, it becomes "0".

As mentioned above, neurons will output a "1" or "0" in response to input data. The ignition pattern of the above neurons depends on input data.

Conventionally, a method for the recognition of characters by a neural network is disclosed in a patent publication hei 1-290582 in which characteristics data of characters (for example, number of end points, number of branch points, etc.) are calculated so as to judge which character the above characteristics data corresponds to.

In addition to the above character recognition, recognition accuracy is an important factor for the above data processing system, which is based on how accurately an input data consisting of a plurality of characteristics data can be recognized. Also, efficiency is essential for a practical system on how the above recognition function is realized with minimum neural network. According to the above conventional example, the effective characteristics data are used for the printed Japanese characters. However, it is unknown what characteristics data may be effectively used for hand writing characters, running style writing characters, European hand writings, special characters such as Arabic, etc. The more characteristics data are applied, the bigger the scale of data processing system becomes.

SUMMARY OF THE INVENTION

The present invention solves the above-mentioned problems of the prior art and has an object to provide a method of selecting effective characteristics for the case when focusing of effective characteristics data is not possible.

A method of selecting characteristics data for a data processing system according to the present invention comprises steps of storing outputs of said input data, selecting a specific characteristics data of a pair of different input data, exchanging said characteristics data of said input data pair with each other, comparing outputs from said data processing system in response to said input data before and after the exchange of said characteristics data, and removing said characteristics data from said input data in said group, when a difference between said outputs before and after is comparatively small.

DETAILED DESCRIPTION OF THE PREFERRED EMBODIMENT OF THE PRESENT INVENTION

Hereinafter, the present invention will be described according to a preferred embodiment and referring to the attached drawings.

Figure 2:
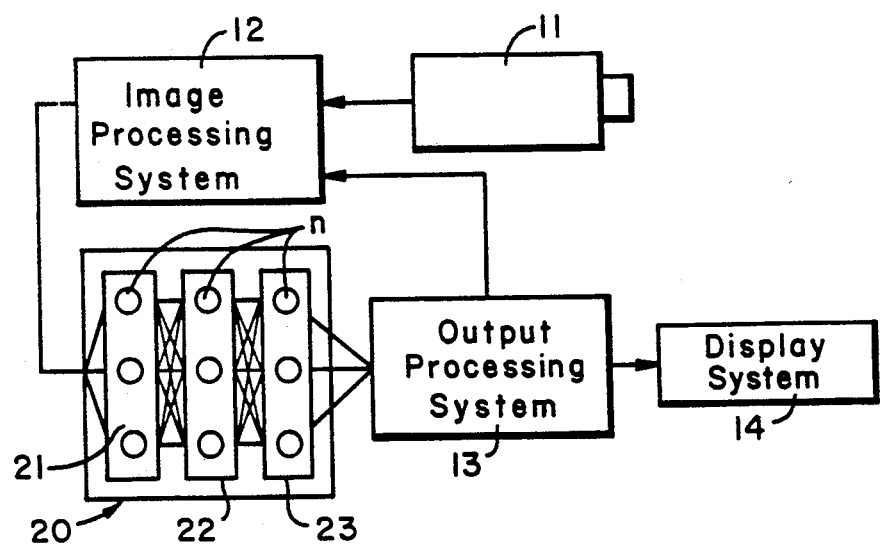
FIG. 2 shows a block diagram indicating a structural example of a recognition system according to the present invention.

FIG. 2 shows a structure of a character recognition system as an example of a data processing system according to the present invention, in which characters are input from a video camera 11. The characteristics data of input characters, i.e., number of end points, number of branch points, etc., are calculated at an image processing system 12. Here, since the calculation manner is well-known, explanation is omitted. An image processing system 12 is connected to a computer 20 with a structure of a neural network in which character recognition is performed by using characteristics data of characters. The computer 20 recognizes characters by investigating which of the input characteristics data closely resembles the characteristics data of a character. A recognized character is input to an output processing system 13 in which it is converted to a predetermined data format so as to be displayed by a display system 14. A display system 14, comprising a CRT, for example, displays the recognized characters.

An output processing system 13 is also connected to the image processing system 12, and is structured to output an ignition pattern of neurons outside of a computer 20 to image processing system 12, so that image processing system 12 performs the selection of characteristics data of a character.

A computer 20 is structured with a neural network as described above, in FIG. 2. The structure of the neural network is schematically indicated. As it is understood from the figure, the neural network according to the present embodiment comprises 3 neural layers 21, 22 and 23 that are comprised by a plurality of neurons n, respectively. Each neuron n of neural layer 21 at the input side is connected to each neuron n of neural layer 22 in the middle of layers, respectively. Each neuron n of neural layer 22 in the middle layer is connected to each neuron n of neural layer 23 at output side, respectively.

Each neuron comprising, for example, an operational amplifier, outputs according to the comparison results between the sum of each multiplied input data by weights and threshold, as it is described above. Accordingly, neuron n, for example, ignites and outputs "1" when the sum exceed the threshold and outputs "0" when the sum is smaller than the threshold.

Figures 3A, 3B:
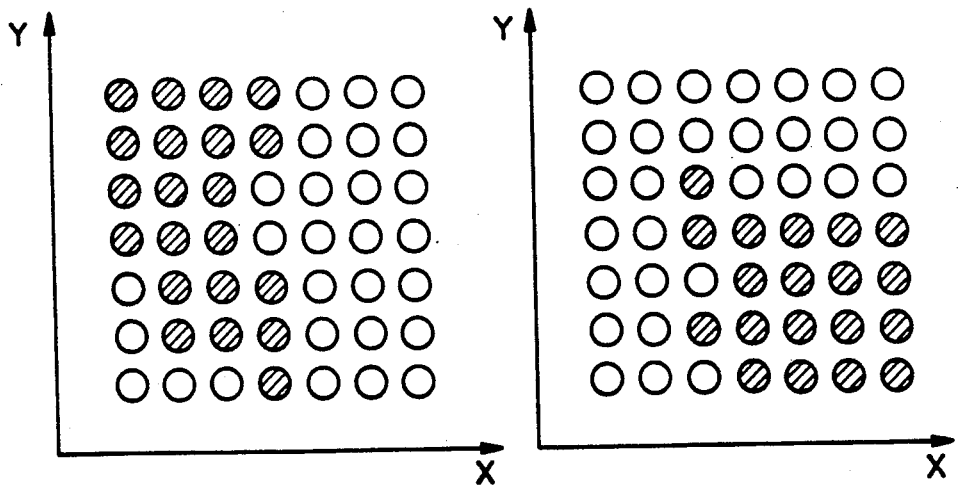
FIG. 3 (a) and (b) show diagrams indicating examples of ignition patterns of neurons according to the neural network at the output side.

FIGS. 3 (a) and (b) show neurons of neural layer 23 at the output side by x and y coordinates. In the figure, igniting neurons are shown by black circles and other neurons are shown by white circles. Here, it is assumed that FIG. 3 (a) shows the ignition pattern of neurons of neural layer 23 when an input character from a camera 11 is "A" and FIG. 3 (b) shows the ignition pattern of neurons when an input character is "B". As it is understood from the figure, more neurons at the left than the right are ignited with respect to "A", and more neurons at the right are ignited with respect "B". As mentioned above, the ignition pattern is changed in accordance with the data input to the neural layer.

Figure 1:
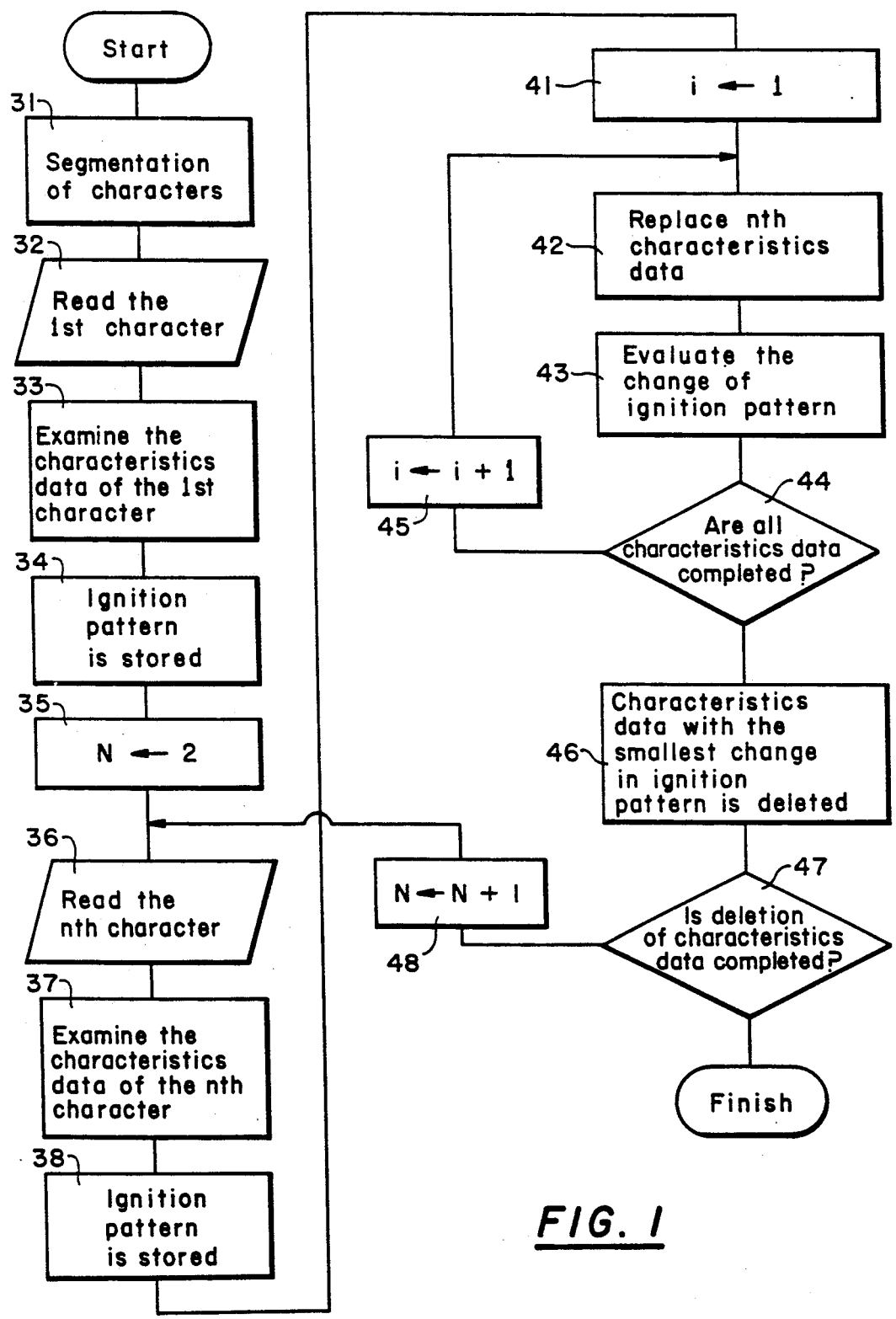
FIG. 1 shows a flow chart indicating the selection method of the effective characteristics data according to a preferred embodiment of the present invention.

FIG. 1 shows an example of a character recognition method performed by the recognition system of FIG. 2 according to the preferred embodiment of the present invention.

Figure 4:
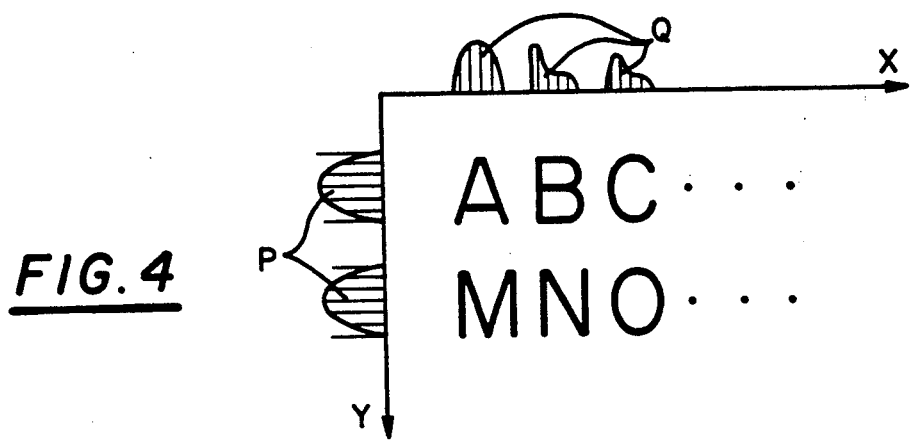
FIG. 4 shows a diagram indicating the characters' groups and their density projections.

At step 31, character segmentation is performed at an image processing system 12 for the segmentation of each character among a plurality of input characters' group. According to the preferred embodiment, character segmentation is performed at step 31 for the recognition processing regarding to one character among a plurality of characters photographed by a camera 11 at one time. As shown in FIG. 4, for example, characters' groups "A B C . . . " and "M N O . . . " are arranged on the first and second row, respectively, where x and y coordinates are defined to be horizontal and vertical, respectively. The breaks between character strings are detected by calculating the density projections with respect to the y coordinate as shown by reference P. Then the breaks between characters are detected by calculating the density projections with respect to the x coordinate as shown by reference Q. After the above processing, fillet diameter is calculated. Then, noise processing and labeling on the above fillet diameters are performed so as to segment each character.

At step 32, the first character, i.e. "A" in FIG. 4, is read. As the characteristics data of a character, there are a "number of end points", a "number of branch points", a "number of holes", a "number of groups", a "stroke", a "density projection" and a "roundness". At step 33, the above 7 characteristics are calculated with respect to the first character. These characteristics data are calculated at an image processing system 12 by well-known methods, and stored to a memory of a system 12 as well as input to a computer 20. The ignition pattern in the neural layer 23 at the output side when the above characteristics data are input is stored at step 34.

At step 35, parameter "N" is determined to be "2". At step 36, the Nth, i.e. the 2nd, character is read in the same manner as at step 32. At step 37, the above 7 characteristics data are calculated with respect to the 2nd character. These characteristics data are stored in a memory of image processing system 12, as well as input to the computer 20. At step 38, the ignition pattern of the 2nd character is stored at step 34.

At step 41, parameter "i" is determined to be "1". At step 42, the ith, i.e. the first characteristics data (for example, "number of end points") among the characteristics data of the first character ("A") is replaced with the first characteristics data of the second character ("B"). That is, only the first characteristics of the first character is replaced with that of the second character. According to the above replacement of a characteristics data, the ignition pattern of neurons in neural layer 23 at the output side is changed from the original ignition pattern. Therefore, the ignition pattern in FIG. 3 (a) is changed. At step 43, the change in the ignition pattern is evaluated. The evaluation of the change the ignition pattern is described in later.

At step 44, it is determined whether or not steps 42 and 43 have been performed for all characteristics data. Here, when the processings of steps 42 and 43 for all characteristics data are completed, step 43 is performed. When they are not completed, a parameter "i" at step 45 is increased by 1, then steps 42 and 43 are repeated. Accordingly, the next characteristics data (for example, number of branch points) among characteristics data of the first character ("A") is replaced with corresponding characteristics data of the second character ("B"), so that the change in the ignition pattern is evaluated.

After the change in the ignition pattern for the above 7 characteristics data is evaluated, a characteristics data with the least changes in the ignition pattern when it is replaced, that is, a characteristics data which exerts less influences onto the change in ignition pattern, is selected.

Hereinafter, evaluation of the change in ignition pattern performed at step 43 is described. The evaluation of the change in ignition pattern is performed by, for example, comparing the density deviation within a class and the deviation between classes.

Accordingly, the ignition pattern is expressed by a plane with x and y coordinates as in FIG. 3 (a) and (b), so as to obtain x and y coordinates of ignited neurons. For example, when an input character is "A", the density deviation within a class $V_{XA}$ according to x coordinate becomes:

$$V_{XA} = \Sigma(X_A - \overline{X}_A)^2 \quad (1)$$

where $X_A$ is a x coordinate of each ignited neuron, and $\overline{X}_A$ is a mean value of x coordinates of all ignited neurons. Similarly, the density deviation within a class according to y coordinate $V_{YA}$ becomes:

$$V_{YA} = \Sigma(Y_A - \overline{Y}_A)^2 \quad (2)$$

At step 42, the density deviations within a class with respect to the x and y coordinates are calculated according to the ignition pattern when a characteristics data is replaced. In this case, the density deviation within a class according to x coordinate $V_{XB}$ becomes:

$$V_{XB} = \Sigma(X_B - \overline{X}_B)^2 \quad (3)$$

The density deviation within a class according to y coordinate $V_{YB}$ becomes:

$$V_{YB} = \Sigma(Y_B - \overline{Y}_B)^2 \quad (4)$$

Then the density deviation between classes is calculated between the ignition pattern of a character "A" and the ignition pattern when one of characteristics data is replaced. Here, calculation with respect to ignited neurons under at least one of the above equations is performed. Here, the density deviation within a class according to x coordinate $V_{XT}$ is:

$$V_{XT} = \Sigma(X_T - \overline{X}_t)^2 \quad (5)$$

The density deviation within a class according to y coordinate $V_{YB}$ is:

$$V_{YB} = \Sigma(Y_B - \overline{Y}_B)^2 \quad (6)$$

The ratio between the density deviation within a class and the density deviation between classes is defined as the deviation ratio. The deviation ratio in the x coordinate is calculated according to the formulas (1), (3) and (5), as follows:

$$F_X = V_{XT}/(V_{XA} \times V_{XB}) \quad (7)$$

The deviation ratio in the y coordinate is calculated according to the formulas (2), (4) and (6), as follows:

$$F_Y = V_{YT}/(V_{YA} \times V_{YB}) \quad (8)$$

As mentioned above, the change in ignition pattern when a characteristics data is replaced is evaluated so as to extract the characteristics data with the least changes at step 46. Accordingly, an ineffective characteristics data for the character recognition is extracted. According to the above extraction, it is possible to compare the sum of the deviation ratios $F_X$ and $F_Y$, or to compare either smaller or bigger values of the deviation ratios $F_X$ and $F_Y$.

Besides the determination of density deviation according to the x and y coordinates of the ignited neurons, the investigation of density deviation by using a revolutionary straight line is possible. Here, the distance from an ignited neuron to a revolutionary straight line is deemed to be "$d_A$" when it is an original characteristics data, and it is deemed to be "$d_B$" when one characteristics data is replaced. Also, the mean values with respect to the above distances are deemed to be $\bar{d}_A$ and $\bar{d}_B$, respectively. The density deviation within a class $V_A$ with respect to an original characteristics data is:

$$V_A = \Sigma(d_A - \bar{d}_A)^2 \quad (10)$$

The density deviation within a class $V_B$ when a characteristics data is replaced is:

$$V_B = \Sigma(d_B - \bar{d}_B)^2 \quad (11)$$

The density deviation between classes $V_T$ is:

$$V_T = \Sigma(d_T - \bar{d}_T)^2 \quad (12)$$

Therefore, the deviation ratio F is:

$$F = V_T/(V_A \times V_B) \quad (13)$$

Then, an ineffective characteristics data for the character recognition is extracted according to the above deviation ratio.

The extraction of an ineffective characteristics data for the change in ignition pattern performed at step 43 and step 46 can be performed together with contrast or moment of the texture analysis. It is also possible to investigate the independency of two ignition patterns by using Bayse theorem, as a statistics method.

After an ineffective characteristics data for the character recognition is extracted at step 46, the judgment is performed at step 47 whether all prearranged characteristics data extractions are completed or not. According to the present embodiment, the deletion processing of the characteristics data is completed when four ineffective characteristics data out of seven is deleted. On the other hand, when deletion of four ineffective characteristics data is not completed, parameter N is increased by "1" at step 48, and returns to step 36. Then similar processing, as it is described above, is performed with respect to the next character, so as to select and delete the ineffective characteristics data.

According to the above, 3 characteristics data are determined so that it is possible to perform character recognition by using 3 characteristics data thereafter. According to the present embodiment, it becomes possible to develop a system for the character recognition by using only the effective characteristics data. Furthermore, a character recognition system obtained above enables the capacity of the neural network to be curtailed to the necessary minimum, so as to miniaturize the neural network or a data processing system with equivalent structure thereto, since the number of employed characteristics data is small.

At step 36, it is possible, for example, to perform pattern matching so as not to read the same character as the previous one when the next character is read.

The above embodiment is for the performance of the selection of the effective characteristics data with respect to the character recognition. However, it is possible to apply a similar method to a system for the recognition of the configuration or recognition of written notes.

According to the present invention as mentioned above, it is possible to select characteristics data efficiently, even when the effective characteristics data are not focused enough. Therefore, miniaturization of a data processing system is possible.

What is claimed is:

1. A method of selecting characteristics data from a group of input data for reducing data volume of each input data of said group, using a data processing system having a neural network structure, where each of said input data includes a plurality of said characteristics data, said method comprising the steps of:

storing an ignition pattern representing neurons corresponding to each of said input data;

selecting one of said characteristics data for a pair of different input data;

exchanging said characteristics data of each input data in said input data pair with each other;

comparing ignition patterns representing neurons corresponding to said input data pair before and after said exchange of said characteristics data; and removing said characteristics data from said group of input data when a difference between a result from said comparing step is relatively small.

* * * * *